United States Patent
Kim et al.

(10) Patent No.: US 10,063,395 B2
(45) Date of Patent: Aug. 28, 2018

(54) METHOD FOR ESTIMATING CHANNEL STATUS IN WIRELESS COMMUNICATION SYSTEM, AND APPARATUS THEREFOR

(71) Applicant: LG ELECTRONICS INC., Seoul (KR)

(72) Inventors: Bonghoe Kim, Seoul (KR); Kijun Kim, Seoul (KR); Hyungtae Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/541,237

(22) PCT Filed: Jan. 5, 2016

(86) PCT No.: PCT/KR2016/000056
§ 371 (c)(1),
(2) Date: Jun. 30, 2017

(87) PCT Pub. No.: WO2016/111524
PCT Pub. Date: Jul. 14, 2016

(65) Prior Publication Data
US 2018/0006845 A1    Jan. 4, 2018

Related U.S. Application Data

(60) Provisional application No. 62/100,052, filed on Jan. 5, 2015.

(51) Int. Cl.
*H04L 25/02* (2006.01)
*H04B 7/06* (2006.01)

(52) U.S. Cl.
CPC ....... *H04L 25/0242* (2013.01); *H04B 7/0626* (2013.01); *H04B 7/06* (2013.01)

(58) Field of Classification Search
CPC .................................. H04L 25/02; H04B 7/06
See application file for complete search history.

(56) References Cited

U.S. PATENT DOCUMENTS

| | | | |
|---|---|---|---|
| 2009/0054093 A1* | 2/2009 | Kim | H04B 7/061 455/500 |
| 2012/0127878 A1* | 5/2012 | Kim | H04W 74/002 370/252 |

(Continued)

FOREIGN PATENT DOCUMENTS

KR    10-2014-0058976 A    5/2014

OTHER PUBLICATIONS

Catt, "Discussion on Potential Standardized Enhancements Targeting 2D Antenna Array," 3GPP TSG RAN WG1 Meeting #79, R1-144632, San Francisco, USA, Nov. 17-21, 2014, pp. 1-3.

(Continued)

*Primary Examiner* — Jaison Joseph
(74) *Attorney, Agent, or Firm* — Birch, Stewart, Kolasch & Birch, LLP

(57) ABSTRACT

A method for estimating a channel status by a base station in a wireless communication system according to an embodiment of the present invention comprises the steps of: obtaining an uplink channel matrix by using a sounding reference signal (SRS) received from a terminal; transmitting a channel state information-reference signal (CSI-RS) through at least some antenna devices in a two-dimensional antenna array of the base station; receiving a channel quality indicator (CQI) calculated on the basis of the CSI-RS transmission; and obtaining, through a predetermined correction factor obtained on the basis of the CQI and the uplink channel matrix, a downlink channel matrix for the entire (Continued)

two-dimensional antenna array comprising the remaining antenna devices through which the CSI-RS is not transmitted.

12 Claims, 15 Drawing Sheets

(56) References Cited

U.S. PATENT DOCUMENTS

2014/0334325 A1 11/2014 Chandrasekhar et al.
2015/0288497 A1* 10/2015 Li ..................... H04B 7/0413
 370/329
2016/0204921 A1* 7/2016 Kim ..................... H04L 12/189
 370/312

OTHER PUBLICATIONS

Deutsche Telekom AG et al., "Coordinated Link Adaptation Based on Multi-Cell Channel Estimation in the LTE-A Uplink," 3GPP TSG RAN WG1 Meeting #59, R1-095067, Jeju, South Korea, Nov. 9-13, 2009, pp. 1-6.

* cited by examiner

FIG. 2
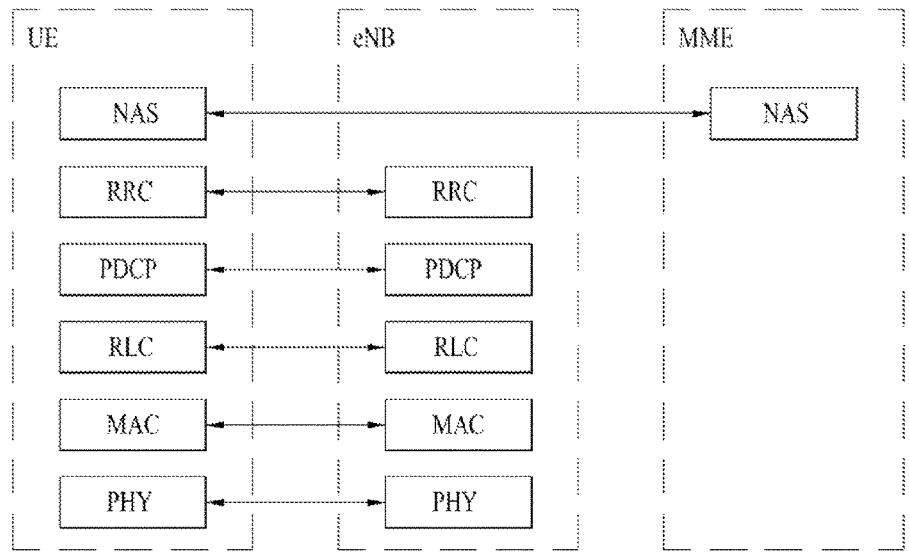
(a) Control-plane protocol stack
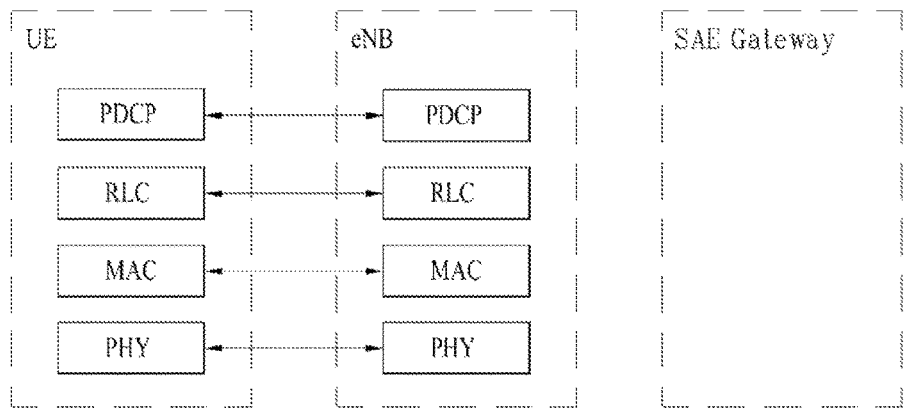
(b) User-plane protocol stack ☐ : DMRS group 1
▨ : DMRS group 2

(a) Existing antenna system    (b) Active antenna system

A Block

B Block

METHOD FOR ESTIMATING CHANNEL STATUS IN WIRELESS COMMUNICATION SYSTEM, AND APPARATUS THEREFOR

CROSS REFERENCE TO RELATED APPLICATIONS

This application is the National Phase of PCT International Application No. PCT/KR2016/000056, filed on Jan. 5, 2016, which claims priority under 35 U.S.C. 119(e) to U.S. Provisional Application No. 62/100,052, filed on Jan. 5, 2015, all of which are hereby expressly incorporated by reference into the present application.

TECHNICAL FIELD

The present invention relates to a wireless communication system, and more particularly, to a method for estimating a downlink channel in a two-dimensional antenna array based wireless communication system and apparatus therefor.

BACKGROUND ART

3GPP LTE (3rd generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '3rd Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding, user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

DISCLOSURE OF THE INVENTION

Technical Task

The technical task of the present invention is to provide a method for accurately and efficiently estimating a downlink channel in a two-dimensional antenna array based wireless communication system and apparatus therefor.

It will be appreciated by persons skilled in the art that the objects that could be achieved with the present invention are not limited to what has been particularly described hereinabove and the above and other objects that the present invention could achieve will be more clearly understood from the following embodiments.

Technical Solutions

In an aspect of the present invention, provided is a method for estimating a channel by a base station (BS) in a wireless communication system, including: obtaining an uplink channel matrix using a sounding reference signal (SRS) received from a user equipment (UE); transmitting a channel state information-reference signal (CSI-RS) through at least a part of antenna elements in a two-dimensional (2D) antenna array of the BS; receiving a channel quality indicator (CQI) calculated from the transmitted CSI-RS; and obtaining, through a prescribed correction factor obtained from the CQI and the uplink channel matrix, a downlink channel matrix for the entire 2D antenna array including remaining antenna elements not used for the CSI-RS transmission.

In another aspect of the present invention, provided is a base station (BS) in a wireless communication system, including: a transmitter configured to transmit a channel state information-reference signal (CSI-RS) through at least a part of antenna elements in a two-dimensional (2D) antenna array of the BS; a receiver configured to receive a channel quality indicator calculated from the transmitted CSI-RS; and a processor configured to obtain an uplink channel matrix using a sounding reference signal (SRS) from a user equipment (UE) and obtain, through a prescribed correction factor obtained from the CQI and the uplink channel matrix, a downlink channel matrix for the entire 2D antenna array including remaining antenna elements not used for the CSI-RS transmission.

In a further aspect of the present invention, provided is a method for reporting a channel state by a user equipment (UE) in a wireless communication system, including: transmitting a sounding reference signal (SRS) to a base station (BS); receiving a channel state information-reference signal (CSI-RS) through at least a part of antenna elements in a two-dimensional (2D) antenna array of the BS; and transmitting, to the BS, a channel quality indicator (CQI) calculated from the CSI-RS. In this case, a downlink channel matrix for the entire 2D antenna array including remaining antenna elements not used for the CSI-RS transmission may be obtained by adjusting an uplink channel matrix estimated from the SRS transmission through a prescribed correction factor calculated based on the CQI.

Preferably, the BS may calculate the downlink channel matrix by adjusting the uplink channel matrix using the prescribed correction factor.

Preferably, the prescribed correction factor may represent interference characteristics of downlink channels from the 2D antenna array to the UE.

Preferably, the prescribed correction factor is defined as follows:

$$\frac{1}{|\alpha|\sqrt{I}},$$

where 'α' is a complex constant representing a relationship between estimated downlink channels and actual downlink channels and indicates downlink channel interference.

Preferably, the BS may transmit the CSI-RS through one of a plurality of antenna blocks arranged in a first direction in the 2D antenna array.

More preferably, the one antenna block through which the CSI-RS is transmitted may be either explicitly indicated to the UE through radio resource control (RRC) signaling or implicitly indicated by a mapping relationship between CSI-RS time resources and the plurality of the antenna blocks.

Preferably, the CQI may be calculated by assuming that a physical downlink shared channel (PDSCH) is transmitted based on either a 2-transmit diversity scheme or a 4-transmit diversity scheme.

Preferably, a rank indicator (RI) and a precoding matrix index (PMI), which are not fed back by the UE, may be calculated from the obtained downlink channel matrix.

Advantageous Effects

According to embodiments of the present invention, it is possible not only to reduce overhead caused by CSI feedback by estimating a downlink channel based on channel reciprocity but also to estimate the downlink channel more accurately by reflecting interference characteristics between downlink channels through CQI measurement and reporting for at least some antennas in a two-dimensional antenna array based wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

FIG. 2 is a diagram of structures of control and user planes of a radio interface protocol between a user equipment and E-UTRAN based on 3GPP radio access network specification.

BEST MODE FOR INVENTION

Figure 1:
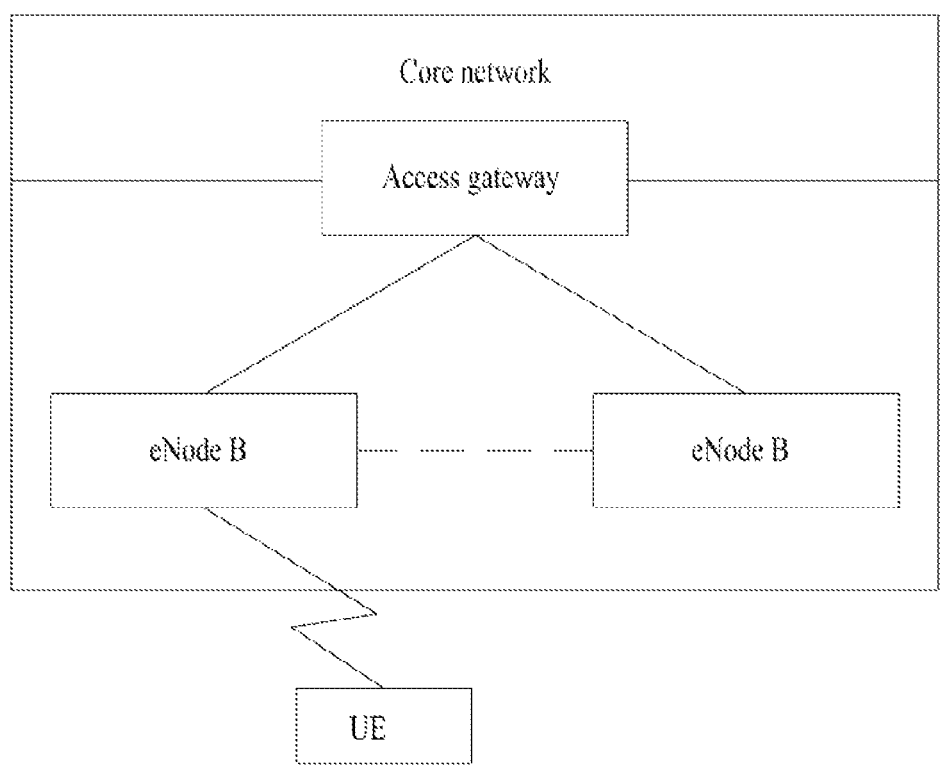
FIG. 1 is a schematic diagram of E-UMTS network structure as an example of a mobile communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

In the present specification, a name of a base station can be used as an inclusive terminology for RRH (remote control head), eNB, TP (transmission point), RP (repetition point), RN (relay node) or the like.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCFI or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
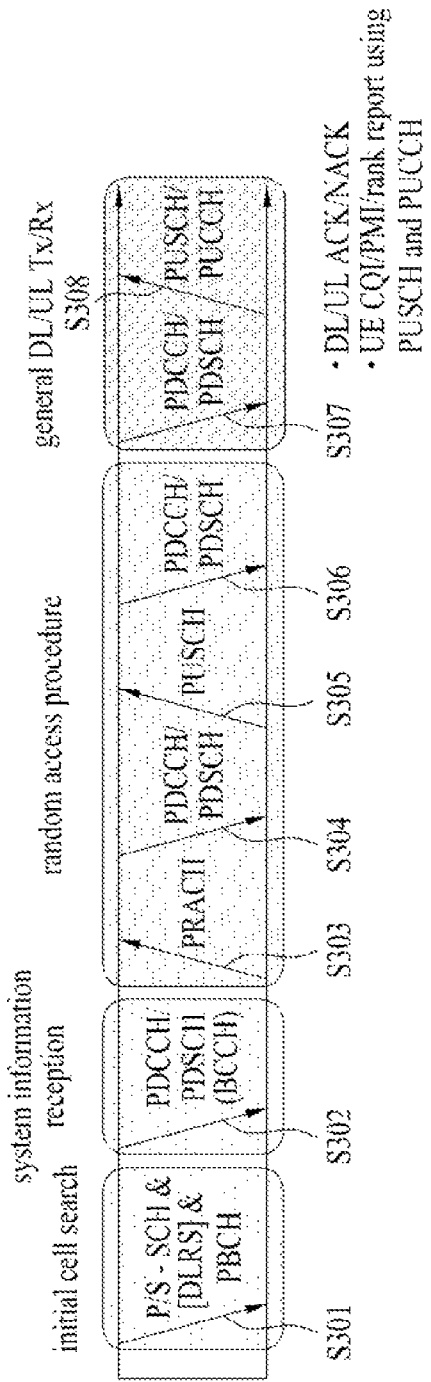
FIG. 3 is a diagram for explaining physical channels used for 3GPP system and a general method of transmitting a signal using the same.

FIG. 3 is a diagram for explaining physical channels used by 3GPP system and a general signal transmitting method using the same.

Referring to FIG. 3, if a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
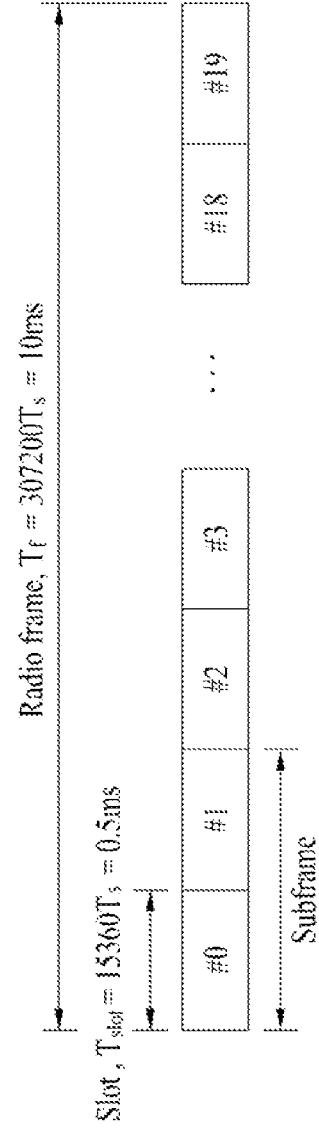
FIG. 4 is a diagram for an example of a structure of a radio frame used for LTE system.

FIG. 4 is a diagram for an example of a structure of a radio frame used by LTE system.

Referring to FIG. 4, a radio frame has a length of 10 ms (327200×Ts) and is constructed with 10 subframes in equal size. Each of the subframes has a length of 1 ms and is constructed with two slots. Each of the slots has a length of 0.5 ms (15360×Ts). In this case, Ts indicates a sampling time and is expressed as Ts=1/(15 kHz×2048)=3.2552×10-8 (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
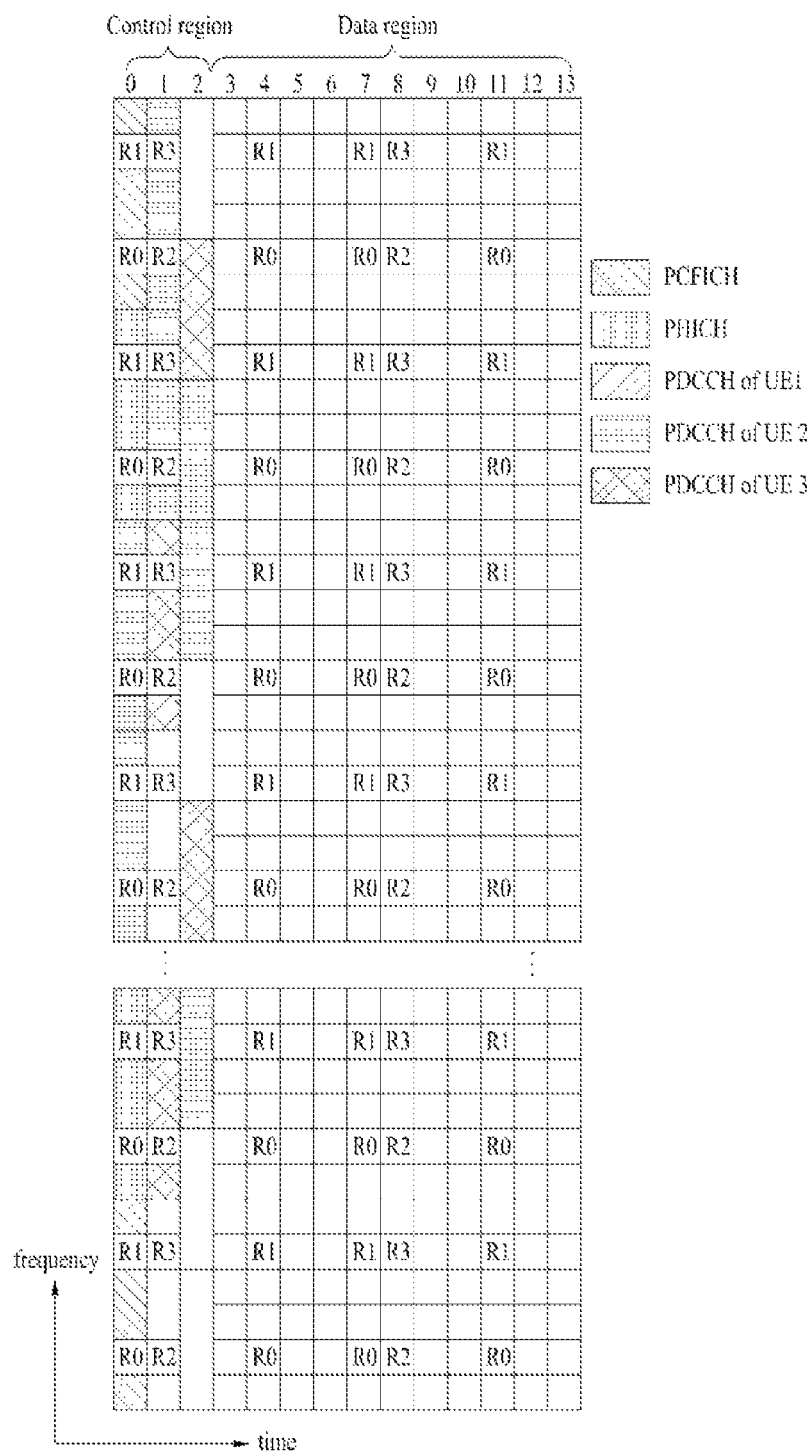
FIG. 5 is a diagram for one example of a structure of a downlink (DL) subframe used by LTE system.

FIG. 5 is a diagram for one example of a control channel included in a control region of one subframe in a downlink (DL) radio subframe.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 6:
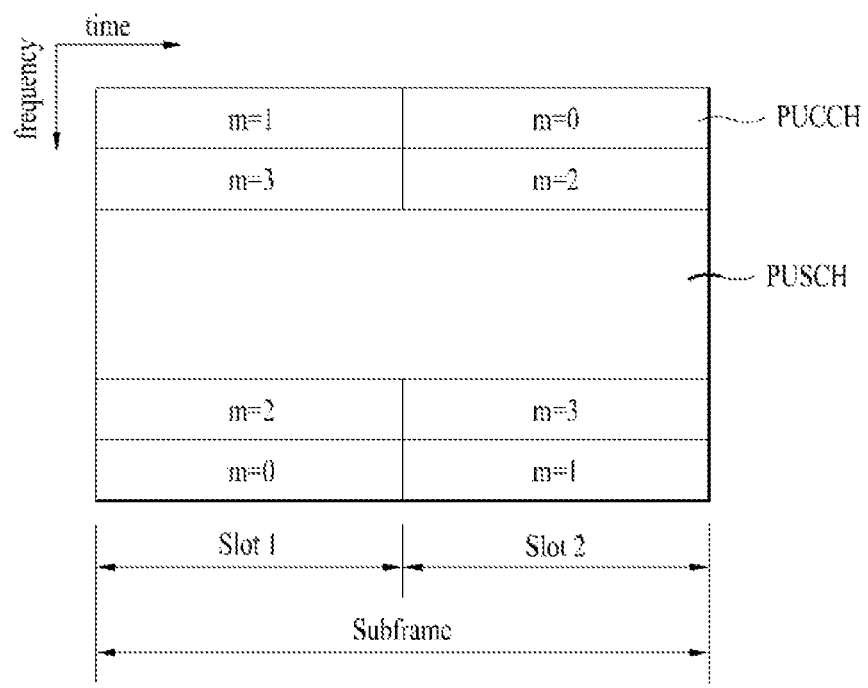
FIG. 6 is a diagram for one example of a structure of an uplink (UL) subframe used by LTE system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCFI for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

In the following description, MIMO system is explained. First of all, MIMO (multi-input multi-output) is a method that uses a plurality of transmitting antennas and a plurality of receiving antennas. And, this method may be able to improve efficiency in transceiving data. In particular, a transmitting or receiving stage of a wireless communication system uses a plurality of antennas to increase capacity or enhance performance. In the following description, the MIMO may be called 'multiple antennas (multi-antenna)'.

The MIMO technology does not depend on a single antenna path to receive one whole message. Instead, the MIMO technique completes data by putting fragments received via several antennas together. If the MIMO technique is adopted, a data transmission rate within a cell area having a specific size may be improved or a system coverage may be increased by securing a specific data transmission rate. Moreover, this technique may be widely applicable to a mobile communication terminal, a relay and the like. According to the MIMO technique, it may be able to overcome the transmission size limit of the related art mobile communication which used to use a single data.

Figure 7:
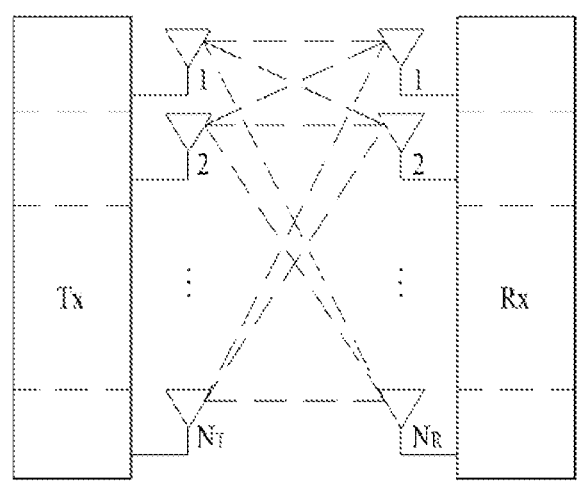
FIG. 7 is a diagram for a configuration of a general multi-antenna (MIMO) communication system.

FIG. 7 is a diagram for a configuration of a general multi-antenna (MIMO) communication system. $N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_O$, the transmission rate in case of using multiple antennas may be theoretically raised by a result from multiplying the maximum transmission rate $R_O$ by a rate increasing rate $R_i$, as shown in Formula 1. In this case, $R_i$ is a smaller one of $N_T$ and $N_R$.

$$R_i = \min(N_T, N_R) \qquad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 7, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$s = [s_1, s_2, \ldots, s_{N_T}]^T \qquad \text{[Formula 2]}$$

Meanwhile, transmission powers can be set different from each other for transmission informations $s_1, s_2, \ldots, s_{N_T}$, respectively. If the transmission powers are set to $P_1, P_2, \ldots, P_{N_T}$, respectively, the transmission power adjusted transmission information can be represented as Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Formula 3]}$$

And, $\hat{S}$ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$ may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Formula 5]}$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank (H)) is limited by Formula 6.

$$\text{rank}(H) \leq \min(N_T, N_R) \qquad \text{[Formula 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Formula 7.

$$\text{\# of streams} \leq \text{rank}(H) \leq \min(N_T, N_R) \qquad \text{[Formula 7]}$$

In this case, '# of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

Meanwhile, it is expected that LTE-A system, which is the standard of a next generation mobile communication system, will support CoMP (coordinated multi point) transmission scheme unsupported by the previous standard in order to enhance a data transmission rate. In this case, the CoMP transmission scheme means a transmission scheme for enabling at least two base stations or cells to coordinately communicate with a user equipment to enhance communication performance between a base station (cell or sector) and a user equipment located in a radio shadow area.

The CoMP transmission scheme may be categorized into CoMP-JP (CoMP-Joint Processing) of a coordinated MIMO type through data sharing and CoMP-CS/CB (CoMP Coordinated Scheduling/Coordinated Beamforming).

In CoMP-JP for a case of a downlink, a user equipment can receive data from base stations, each of which performs the CoMP transmission, simultaneously and instantly and is then able to enhance reception performance by combining the signals received from the base stations together [Joint Transmission (JT)]. And, it is able to consider a method for one of the base stations, each of which performs the CoMP transmission, to transmit data to the user equipment at a specific timing point [Dynamic Pont Selection (DPS)].

On the other hand, in CoMP-CS/CB (CoMP Coordinated Scheduling/Coordinated Beamforming), a user equipment can instantly receive data from a single base station, and more particularly, from a serving base station by beamforming.

In CoMP-JP (CoMP-Joint Processing) for a case of an uplink, each base station can receive a PUSCH signal from a user equipment simultaneously [Joint Reception (JR)]. On the other hand, in CoMP-CS/CB (CoMP Coordinated Scheduling/Coordinated Beamforming), a single base station receives PUSCH only. In doing so, determination for using the CoMP-CS/CB (CoMP Coordinated Scheduling/Coordinated Beamforming) is made by coordinated cells (or base stations).

In the following description, channel station information (CSI) reporting is explained. First of all, two kinds of transmission schemes (i.e., open-loop MIMO operational without channel state information and closed-loop MIMO operational based on channel state information) exist in the current LTE standard. Especially, in the closed-loop MIMO, each of a user equipment and a base station can perform beamforming based on channel state information in order to obtain a multiplexing gain of MIMO antenna. In order to obtain the channel state information from the user equipment, the base station sends a reference signal to the user equipment and commands the user equipment to feed channel station information measured based on the reference signal back to the base station via PUCCH (physical uplink control channel) or PUSCH (physical uplink shared channel).

CSI can be mainly classified into three kinds of informations including RI (rank indicator), PMI (precoding matrix index) and CQI (channel quality indication). First of all, as mentioned in the foregoing description, the RI indicates rank information of a channel and means the number streams a user equipment can receive via the same frequency-time resource. Since the RI is determined by long term fading, it is fed back to a base station by periods longer than those of the PMI or CQI in general.

Secondly, the PMI is the value reflecting spatial property of a channel and indicates a precoding matrix index of a base station preferred by a user equipment with reference to such a metric as SINR and the like. Finally, the CQI is a value indicating a strength of a channel and means a reception SINR normally obtainable when a base station uses PMI.

In such an advanced communication system such as the LTE-A standard, additional multi-user diversity can be additionally obtained using MU-MIMO (multi-user MIMO). Since interference between user equipments multiplexed together in antenna domain exists in MU-MIMO, a presence or non-presence of accuracy of CSI may considerably affect not only interference of a user equipment having reported the CSI but also interference of another multiplexed user equipment. Therefore, the MU-MINO requires a CSI reporting more accurate than that of SU-MIMO.

Hence, according to LTE-A standard, a final PMI is determined as designed in a manner of being divided into W1 and W2. In this case, the W1 is a long-term and/or wideband PMI and the W2 is a short-term and/or subband PMI.

For example of a hierarchical codebook transformation method of configuring one final PMI from the W1 and W2 informations, it is able to use a long-term covariance matrix of a channel, as shown in Formula 8.

$$W = \text{norm}(W1\,W2) \quad \text{[Formula 8]}$$

In Formula 8, the W2 is a short-term PMI and indicates a codeword of a codebook configured to reflect short-term channel information, the W indicates a codeword of a final codebook, and the norm(A) means a matrix in which a norm of each column of a matrix A is normalized into 1.

The existing structures of W1 and W2 can be expressed as Formula 9.

$$W1(i) = \begin{bmatrix} X_i & 0 \\ 0 & X_i \end{bmatrix}, \quad \text{[Formula 9]}$$

where $X_i$ is Nt/2 by M matrix.

$$W2(j) = \begin{bmatrix} \overbrace{e_M^k \quad e_M^l \quad e_M^m}^{r\ columns} \\ \cdots \\ \alpha_j e_M^k \quad \beta_j e_M^l \quad \gamma_j e_M^m \end{bmatrix} \text{ (if rank = } r\text{)},$$

where $1 \le k, l, m \le M$ and $k, l, m$ are integer.

In Formula 9, the codeword structure uses cross polarized antenna. This structure is designed by reflecting channel correlation characteristics occurring if an inter-antenna space is very narrow (i.e., if a distance between neighboring antennas is equal to or smaller than a half of a signal wavelength). In case of the cross polarized antenna, antennas can be grouped into a horizontal antenna group and a vertical antenna group. Each of the antenna groups has the property of ULA (uniform linear array) antenna and the two antenna groups coexist.

Hence, inter-antenna correlation of each of the groups has the same property of linear phase increment, while inter-antenna group correlation has the property of phase rotation. Eventually, since a codebook presents a value of quantizing a channel, it is necessary to design the codebook by reflecting channel characteristics intact. For clarity of the following description, one example of Rank-1 codeword configured in the above-described hierarchy can be represented as Formula 10.

$$W1(i) * W2(j) = \begin{bmatrix} X_i(K) \\ \alpha_j X_i(k) \end{bmatrix} \quad \text{[Formula 10]}$$

In Formula 10, the codeword can be expressed as $N_T \times 1$ vectors and is hierachized into an upper vector $X_i(k)$ and a lower vector $a\,\alpha_j X_i(k)$. In this case, the NT indicates the number of transmitting antennas. And, the upper vector and the lower vector show the correlation property of the horizontal antenna group and the correlation property of the vertical antenna group, respectively. It is advantageous if the $X_i(k)$ is represented as a vector having the property of linear phase increment by reflecting the inter-antenna correlation property of each antenna group. For representative example, DFT matrix can be used as the $X_i(k)$.

In such an advanced communication system such as the LTE-A standard, additional multi-user diversity can be additionally obtained using MU-MIMO (multi-user MIMO). Since interference between user equipments multiplexed together in antenna domain exists in MU-MIMO, a presence or non-presence of accuracy of CSI may considerably affect not only interference of a user equipment having reported the CSI but also interference of another multiplexed user equipment. Therefore, the MU-MINO requires a CSI reporting more accurate than that of SU-MIMO.

Moreover, in case of CoMP JT, since several base stations coordinately sends the same data to a specific user equipment, a corresponding system can be theoretically regarded as an MIMO system in which antennas are geographically distributed. In particular, when MU-MIMO is operated in JT, channel state information of high accuracy is required to avoid interference between coordinately scheduled user equipments like the case of a single cell MU-MIMO. In case of CoMP CB, an elaborate channel state information is also required to avoid interference given to a serving cell by a neighbor cell. In order to increase accuracy of channel state information feedback in general, an additional channel state information feedback reporting is required and such reporting is transmitted to a base station on PUCCH or PUSCH.

In the following description, reference signals are explained in detail.

First of all, a reference signal already known to both a transmitting side and a receiving side is generally transmitted for channel measurement to the receiving side from the transmitting side together with data. This reference signal is provided for the channel measurement and also indicates a modulation scheme to play a role in enabling a demodulation process. Reference signals can be categorized into a dedicated reference signal (DRS) for a specific user equipment (UE) and a dedicated reference signal for a base station, i.e., a UE-specific reference signal and a common reference signal (common RS or CRS (cell-specific RS) that is a cell-specific reference signal for all user equipments within a cell. Moreover, the cell-specific reference signal includes a reference signal for measuring and reporting CQI/PMI/RI to a base station from a user equipment. And, such a reference signal is called CSI-RS (channel state information-RS).

Figure 8:
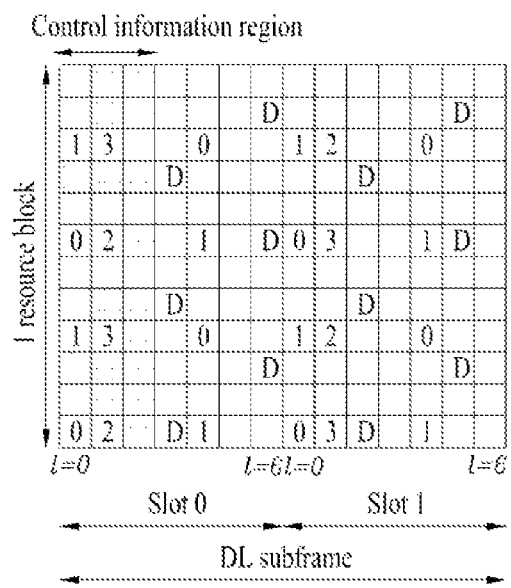
FIG. 8 and FIG. 9 are diagrams for structures of a downlink reference signal in LTE system supportive of a downlink transmission using 4 antennas.
Figure 9:
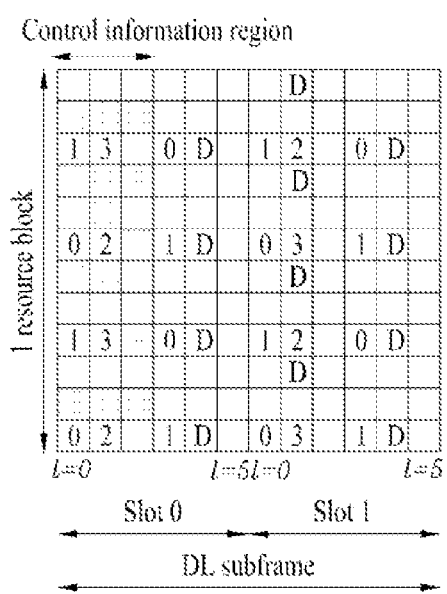

FIG. 8 and FIG. 9 are diagrams for structures of a downlink reference signal in LTE system supportive of a downlink transmission using 4 antennas. Particularly, FIG. 8 shows a case of a normal cyclic prefix and FIG. 9 shows a case of an extended cyclic prefix.

Referring to FIG. 8 and FIG. 9, numerals 0 to 3 entered in a grid correspond to ports 0 to 3 and mean common reference signals (CRS) that are cell-specific reference signals transmitted for channel measurement and data demodulation, respectively. The cell-specific specific reference signals, CRS, can be transmitted to a user equipment across a control information region and a data information region.

'D' entered in the grid means a downlink DM-RS (demodulation-RS) that is a UE-specific RS. The DM-RS supports a single antenna port transmission on PDSCH. A user equipment receives a signaling of a presence or non-presence of DMRS, which is a UE-specific RS, through an upper layer. FIG. 8 and FIG. 9 show examples of DM-RS corresponding to an antenna port 5. In 3GPP standard document 36.211, DM-RSs for antenna ports 7 to 14, i.e., total 8 antenna ports, are defined as well.

Figure 10:
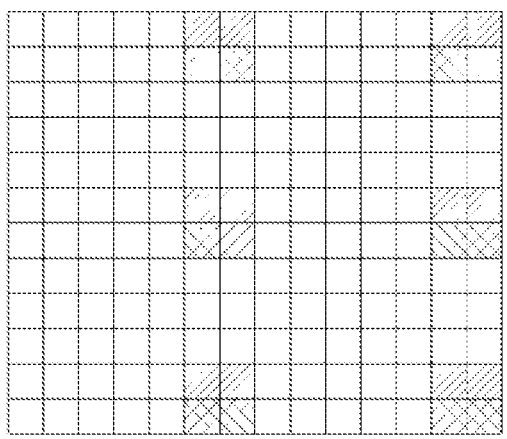
FIG. 10 is a diagram for one example of downlink DM-RS assignment currently defined in 3GPP standard document.
Figure 11:
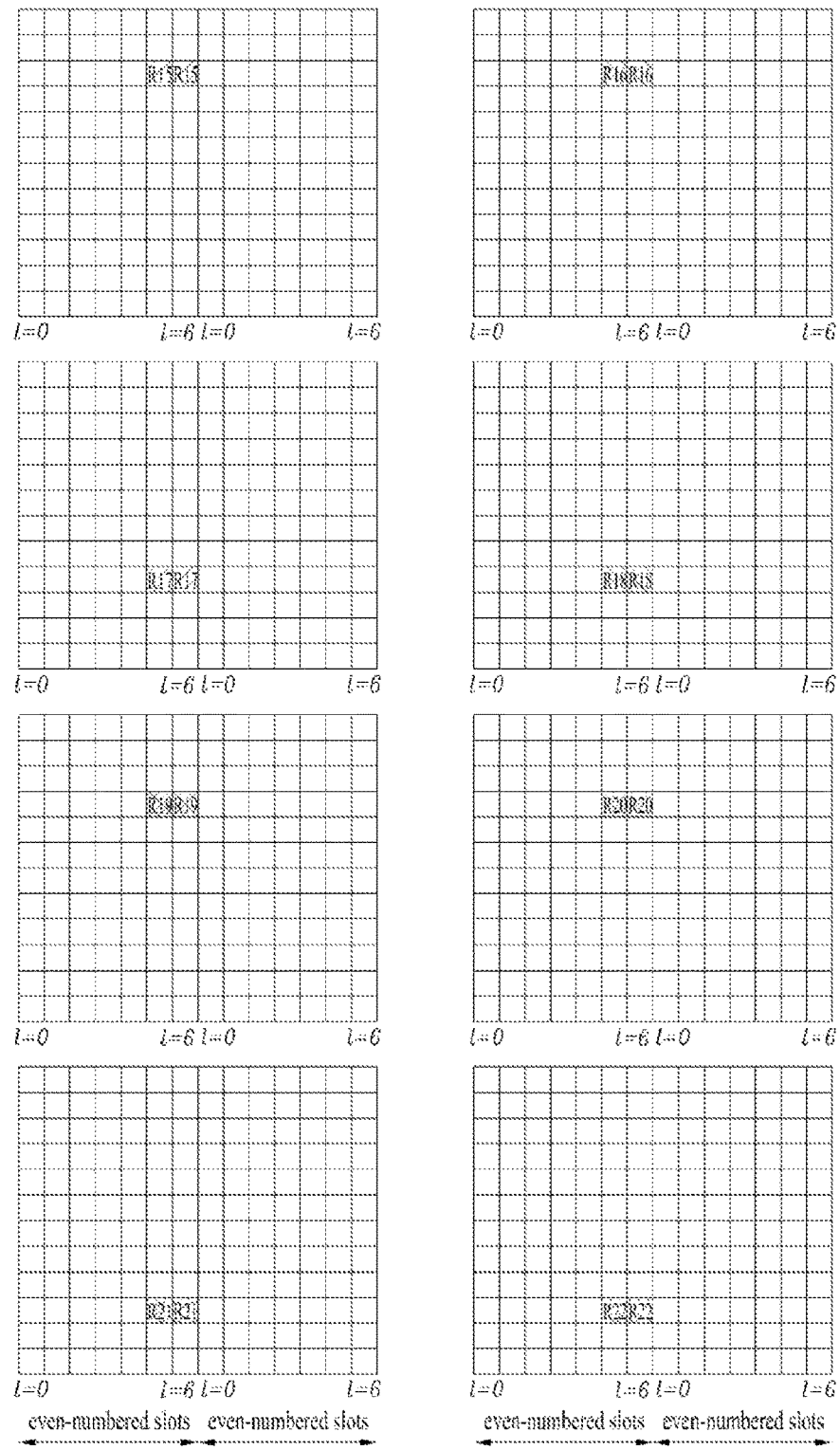
FIG. 11 is a diagram for one example of CSI-RS configuration #0 in case of a normal CP in the downlink CSI-RS configuration currently defined in 3GPP standard document.

FIG. 10 is a diagram for one example of downlink DM-RS assignment currently defined in 3GPP standard document.

Referring to FIG. 10, DM-RS corresponding to antenna port {7, 8, 11, 13} in DM-RS Group 1 is mapped using a sequence per antenna port. Likewise, DM-RS corresponding to antenna port {9, 10, 12, 14} in DM-RS Group 2 are mapped using a sequence per antenna port.

Aside from CRS, the above-mentioned CSI-RS is proposed for the purpose of channel measurement of PDSCH. Unlike CRS, CSI-RSs can be defined into maximum 32 kinds of different CSI-RS configurations in order to reduce inter-cell interference (ICI) in a multi-cell environment.

CSI-RS configurations differ from each other depending on the number of antenna ports. Between neighboring cells, CSI-RS is configured to be transmitted in a manner of being defined to have a CSI-RS configuration as different as possible. Unlike CRS, CSI-RS supports maximum 8 antenna ports. In 3GPP standard document, total 8 antenna ports including antenna ports 15 to 22 are assigned as antenna ports for CSI-RS. In the following, Table 1 and Table 2 show CSI-RS configurations defined in 3GPP standard document. Particularly, Table 1 show a case of a normal CP and Table 2 show a case of an extended CP.

TABLE 1

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |

TABLE 1-continued

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

In Table 1 and Table 2, (k', l') indicates an RE index, k' indicates a subcarrier index, and l' indicates an OFDM symbol index. FIG. 10 is a diagram for one example of CSI-RS configuration #0 in case of a normal CP in the downlink CSI-RS configuration currently defined in 3GPP standard document.

Moreover, CSI-RS subframe configuration can be defined, which is configured with a periodicity $T_{CSI-RS}$ represented by subframe unit and a subframe offset $\Delta_{CSI-RS}$. Table 3 in the following shows CSI-RS subframe configuration defined in 3GPP standard document.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

Currently, information on ZP (zero-power) CSI-RS is transmitted in the format shown in Table 4 via RRC layer signal in a manner of being included in CSI-RS-Config-r10 message. In particular, ZP CSI-RS resource configuration is configured with zeroTxPowerSubframeConfig-r10 and zeroTxPowerResourceConfigList-r10 that is a 16-bit bitmap.

In this case, the zeroTxPowerSubframeConfig-r10 indicates periodicity and subframe offset for transmitting the corresponding ZP CSI-RS through ICSI-RS value corresponding to Table 3. Moreover, the zeroTxPowerResourceConfigList-r10 is the information indicating ZP CSI-RS configuration. And, the elements of the bitmap indicate the settings included in the column having 4 antenna ports for CSI-RS shown in Table 1 or Table 2. In particular, according to the current 3GPP standard document, the ZP CSI-RS is defined only if there are 4 antenna ports for CSI-RS.

TABLE 4

```
-- ASN1START
CSI-RS-Config-r10 ::=                    SEQUENCE {
    csi-RS-r10                           CHOICE {
        ...
    }
    zeroTxPowerCSI-RS-r10                CHOICE {
        release                          NULL,
        setup                            SEQUENCE {
            zeroTxPowerResourceConfigList-r10 BIT STRING (SIZE (16)).
            zeroTxPowerSubframeConfig-r10     INTEGER (0..154)
        }
    }
}
-- ASN1STOP
```

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Meanwhile, an operation for CQI calculation through interference measurement can be described as follows.

First of all, a user equipment needs to calculate SINR as a factor necessary for CQI calculation. In this case, the user equipment can perform a reception power measurement (S-measure) of a desired signal using such RS as NZP CSI-RS and the like. And, the user equipment measures a power of an interference signal resulting from removing the desired signal from the received signal for an interference power measurement (I-measure or IM (interference measurement)).

Subframe sets CCSI,0 and CCSI,1 for CSI measurement can be configured by upper layer signaling. And, subframes corresponding to each of the subframe sets are included in one set only without overlapping each other. In this case, the user equipment (UE) can perform the S-measure through such RS as CSI-RS and the like without particular subframe restrictions. Yet, in case of the I-measure, the user equipment should perform two kinds of different CQI calculations on the CCSI,0 and the CCSI,1 by separately performing the I-measure on each of the CCSI,0 and CCSI,1, respectively.

In the following description, an active antenna system (AAS) and a 3-dimensional (3D) beamforming are explained.

First of all, in an existing cellular system, a base station reduces inter-cell interference and enhances throughput (e.g., SINR (signal to interference plus noise ratio)) of user equipments in a cell, using a mechanical tilting or an electrical tilting. This is described in detail with reference to the accompanying drawings as follows.

Figure 12:
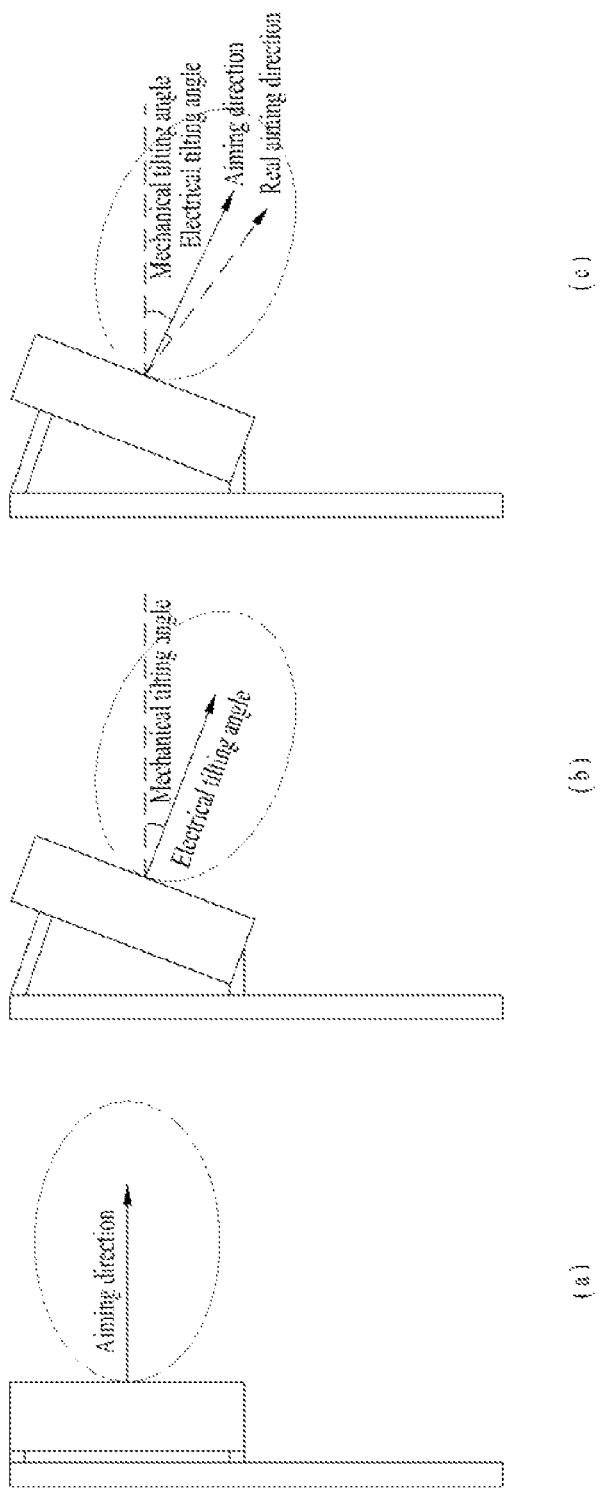
FIG. 12 is a diagram to describe an antenna tilting system.

FIG. 12 is a diagram to describe an antenna tilting system. Particularly, FIG. 12 (a) shows an antenna structure to which an antenna tilting is not applied. FIG. 12 (b) shows an antenna structure to which a mechanical tilting is applied.

And, FIG. 12 (c) shows an antenna structure to which both a mechanical tilting and an electrical tilting are applied.

Comparing FIG. 12 (a) and FIG. 12 (b) to each other, regarding a mechanical tilting, as shown in FIG. 12 (b), it is disadvantageous in that a beam direction is fixed in case of an initial installation. Moreover, regarding an electrical tilting, as shown in FIG. 12 (c), despite that a tilting angle is changeable using an internal phase shift module, it is disadvantageous in that a very restrictive vertical beamforming is available only due to a substantially cell-fixed tilting.

Figure 13:
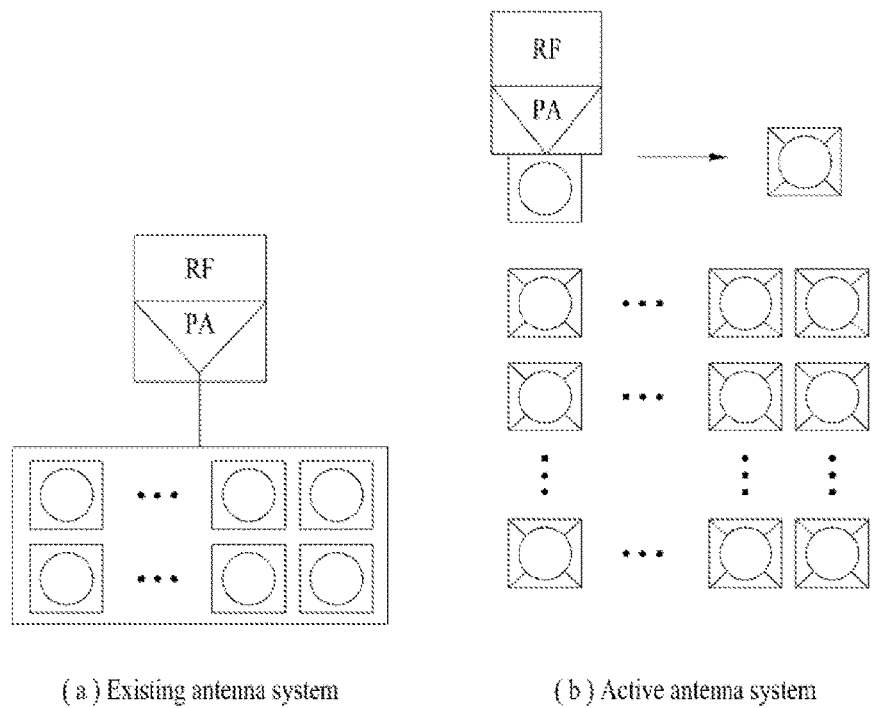
FIG. 13 is a diagram for one example of comparing an existing antenna system and an active antenna system to each other.

FIG. 13 is a diagram for one example of comparing an existing antenna system and an active antenna system to each other. Particularly, FIG. 13 (a) shows an existing antenna system, while FIG. 13 (b) shows an active antenna system.

Referring to FIG. 13, in an active antenna system, unlike an existing antenna system, each of a plurality of antenna modules includes active devices such as a power amplifier, an RF module and the like. Hence, the active antenna system is capable of controlling/adjusting a power and phase for each of the antenna modules.

In a generally considered MIMO antenna structure, a linear antenna (i.e., 1-dimensional array antenna) like a ULA (uniform linear array) antenna is taken into consideration. In this 1-dimensional array structure, a beam generable by beamforming exists in a 2-dimensional plane. This applies to a PAS (passive antenna system) based MIMO structure of an existing base station. Although vertical antennas and horizontal antennas exist in the PAS based base station, since the vertical antennas are combined into one RF module, beamforming in vertical direction is impossible but the above-mentioned mechanical tilting is applicable only.

Yet, as an antenna structure of a base station evolves into AAS, an independent RF module is implemented for each antenna in a vertical direction, whereby a beamforming in a vertical direction is possible as well as in a horizontal direction. Such a beamforming is called an elevation beamforming.

According, to the elevation beamforming, generable beams can be represented in a 3-dimensional space in vertical and horizontal directions. Hence, such a beamforming can be named a 3-dimensional (3D) beamforming. In particular, the 3D beamforming is possible because the 1 D array antenna structure is evolved into a 2D array antenna structure in a plane shape. In this case, the 3D beamforming is possible in a 3D array structure of a ring shape as well as in a planar-shaped antenna array structure. The 3D beamforming is characterized in that an MIMO process is performed in a 3D space owing to antenna deployments of various types instead of an existing ID array antenna structure.

Figure 14:
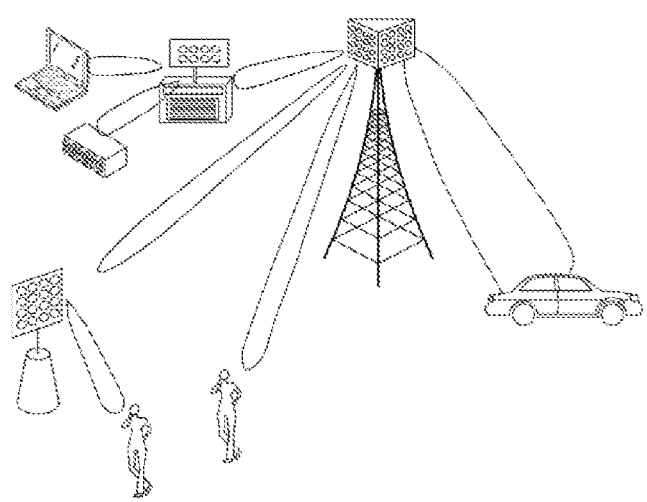
FIG. 14 is a diagram for one example of forming a UE-specific beam based on an active antenna system.

FIG. 14 is a diagram for one example of forming a UE-specific beam based on an active antenna system. Referring to FIG. 14, owing to the 3D beamforming, a beamforming is possible in case that a user equipment moves back and forth as well as in case that the user equipment moves right and left to the base station. Hence, it can be observed that a higher degree of freedom is provided to a UE-specific beamforming.

Moreover, as a transmission environment using an active antenna based 2D array antenna structure, an environment (O2I: outdoor to indoor) of a transmission from an outdoor base station to an indoor user equipment, an environment (indoor hotspot) of a transmission from an indoor base station to an indoor user equipment or the like can be considered as well as an environment of a transmission from an outdoor base station to an outdoor user equipment.

Figure 15:
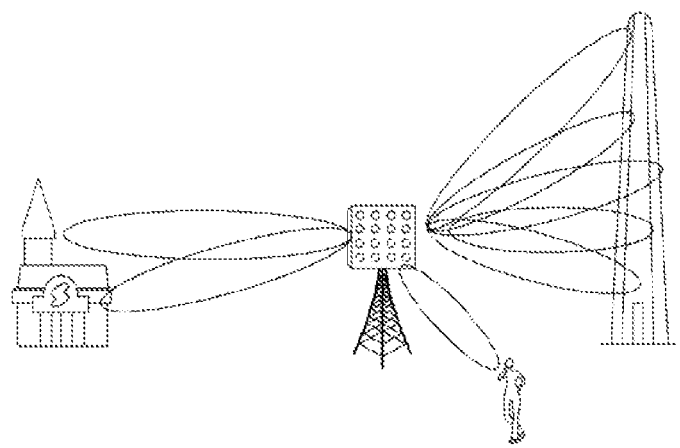
FIG. 15 is a diagram of a 2-dimensional beam transmission scenario based on an active antenna system.

FIG. 15 is a diagram of a 3-dimensional (3D) beam transmission scenario based on an active antenna system.

Referring to FIG. 15, assuming a real cell environment in which a plurality of various buildings exist within a cell, a base station needs to consider a vertical beam steering capability in consideration of various user equipment heights in accordance with a building height as well as a UE-specific horizontal beam steering capability. Considering such a cell environment, it is necessary to reflect channel characteristics (e.g., radio shadow/path loss variation due to a height difference, fading characteristic change, etc.) considerably different from an existing radio channel environment.

So to speak, a 3D beamforming, which is evolved from a horizontal beamforming performed in a horizontal direction only based on an antenna structure of an existing linear 1 D array, indicates an MIMO processing scheme performed in a manner of being extended to and combined with an elevation beamforming or a vertical beamforming based on an antenna structure of multi-dimensional arrays including a planar array and the like.

As described above, the introduction of the AAS has been discussed. Since each antenna in the AAS corresponds to an active antenna including an active circuit, the AAS can change its antenna pattern according to channel states, whereby interference can be reduced and efficient beamforming can also be performed.

Figure 16:
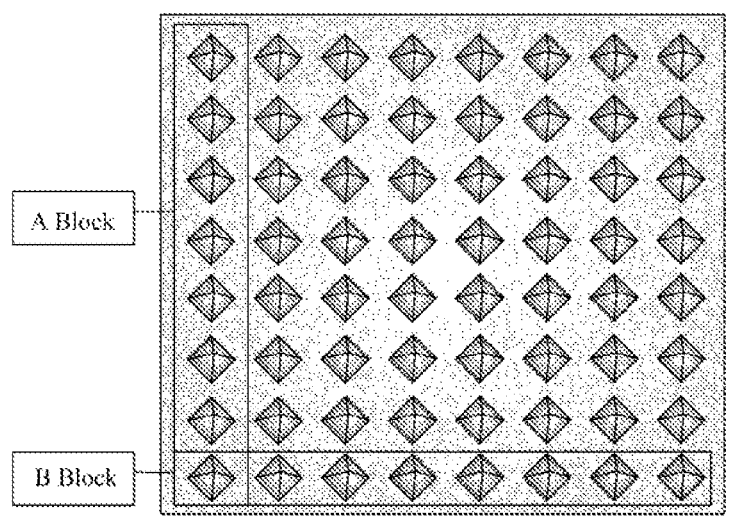
FIG. 16 illustrates an antenna array according to an embodiment of the present invention.

FIG. 16 illustrates an antenna array according to an embodiment of the present invention. Although FIG. 16 shows 2D-AAS with 64 antenna elements, the present invention is not limited thereto.

When the AAS is established in two dimensions (i.e., 2D-AAS), a main lobe of each antenna can be adjusted in three dimensions by changing an antenna pattern. In addition, it is possible to configure a transmitted beam based on a location of a receiving end in an adaptive manner. As shown in FIG. 16, the 2D-AAS may mean an antenna system having multiple antennas where the multiple antennas are installed in the vertical and horizontal directions.

In the 2D-AAS, a transmitting end should transmit a reference signal (RS) to inform a receiving end of a channel from the transmitting end to the receiving end. In this case, the RS may include a CRS or CSI-RS but the present invention is not limited thereto.

The current LTE system supports 1, 2, 4, or 8 antenna ports for CSI-RS transmission. To transmit a CSI-RS for n-antenna port (where n>1), n REs are used in each RB. According to the related art, when the 2D-AAS has 8 vertical antennas and 8 horizontal antennas, i.e., a total of 64 antennas, 64 REs should be used in each RB. That is, CSI-RS overhead (e.g., increase in the number of CSI-RS REs) caused by increase in the number of antennas can be problematic in the 2D-AAS.

To solve the problem of increased CSI-RS overhead, it is possible to consider a method of using some CSI-RS ports to estimate channels for the remaining ports. For example, the channels from the transmitting end (e.g., 2D-AAS) to the receiving end can be estimated using the Kronecker product as shown in Formula 11. However, the invention is not limited thereto.

$$H = \begin{bmatrix} H_T^{(1)} \\ H_T^{(2)} \\ \vdots \\ H_T^{(j)} \\ \vdots \\ H_T^{(N_R)} \end{bmatrix} = \begin{bmatrix} H_V^{(1)} \otimes H_H^{(1)} \\ H_V^{(2)} \otimes H_H^{(2)} \\ \vdots \\ H_V^{(j)} \otimes H_H^{(j)} \\ \vdots \\ H_V^{(N_R)} \otimes H_H^{(N_R)} \end{bmatrix} \quad \text{[Formula 11]}$$

In Formula 11, H indicates all channels from the transmitting end to the receiving end and $H_T^{(j)}$ indicates channels from the transmitting end to a $j^{th}$ receiving antenna. In addition, $H_V^{(j)}$ indicates channels from a vertical antenna array to the $j^{th}$ antenna of the receiving end and $H_H^{(j)}$ indicate channels from a horizontal antenna array to the $j^{th}$ antenna of the receiving end.

For example, referring to FIG. 16, assuming that there are only A block antennas, $H_V^{(j)}$ may indicate channels from the A block antennas to the $j^{th}$ antenna of the receiving end. Similarly, assuming that there are only B block antennas, $H_H^{(j)}$ may indicate channels from the B block antennas to the $j^{th}$ antenna of the receiving end. Although the description is made from the perspective of a random single receiving antenna for convenience of description, the embodiments can be applied when there are a plurality of receiving antennas. Hereinafter, the invention will be described based on channels from the transmitting end to a random single antenna. That is, the index j of the receiving antenna will be omitted.

$$H_T = H_V \otimes H_H \quad \text{[Formula 12]}$$

Here, Formula 12 is devised to describe the present invention. That is, if an actual channel is different from that shown in Formula 12, the embodiments of the present invention can be applied to the actual channel.

According to an embodiment of the present invention, it is possible to consider a method for configuring a total of two CSI-RSs by configuring a CSI-RS for $N_V$ vertical antenna ports similar to the A block of FIG. 16 and a CSI-RS for $N_H$ horizontal antenna ports similar to the B block of FIG. 16.

After receiving and measuring the two CSI-RSs, the receiving end can estimate channels by performing the Kronecker product of two channel matrices as shown in Formula 12. The present embodiment has advantages in that the receiving end can estimate channels for up to 64 ports through the conventional 2, 4, or 8 CSI-RS ports. For example, if a CSI-RS is transmitted through horizontal 8-antenna port and another CSI-RS is transmitted through vertical 8-antenna port, channels for up to 64 antenna ports can be estimated based on Formula 12.

Figure 17:
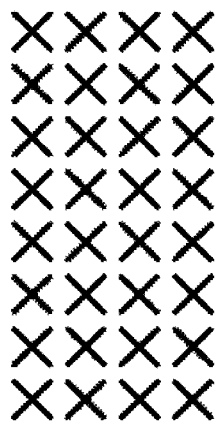
FIG. 17 illustrates a cross-polarized antenna array applicable to an embodiment of the present invention.

FIG. 17 illustrates a cross-polarized antenna array applicable to an embodiment of the present invention. Particularly, the cross-polarized antenna array (hereinafter abbreviated as X-pol AA) of FIG. 17 can be used instead of the co-polarized antenna array shown in FIG. 16.

Figure 18:
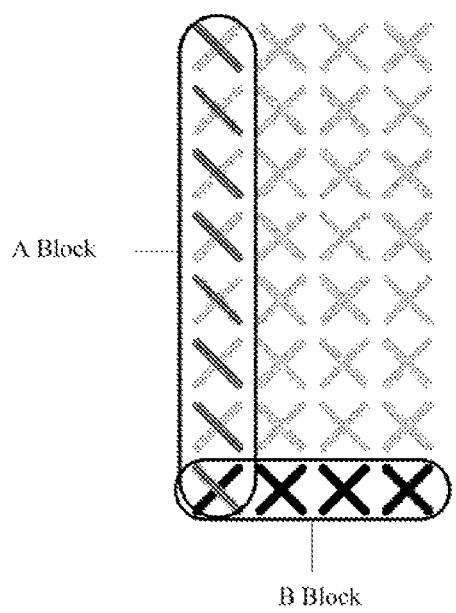
FIG. 18 illustrates vertical and horizontal antenna elements of a 64 X-pol antenna array according to an embodiment of the present invention.

FIG. 18 illustrates vertical and horizontal antenna elements of a 64 X-pol antenna array according to an embodiment of the present invention.

The CSI feedback mode where PMI/RI are not reported is mainly used to reduce the CSI feedback overhead based on the channel reciprocity in the TDD system. For example, a downlink channel is estimated using a sounding RS (SRS) transmitted in uplink instead of providing feedback of the PMI/RI and a BS adjusts a channel estimation value, which is obtained by using the SRS, based on the CSI feedback simpler than the PMI/RI feedback. The reason for why the BS adjusts the channel estimation value is that the effect of downlink interference is not reflected in the downlink channel estimated through the SRS. A relationship between the downlink channel estimated through the SRS and the actual downlink channel can be given as Formula 13.

$$\tilde{H} = \alpha H \quad \text{[Formula 13]}$$

In Formula 13, $\tilde{H}$ is the downlink channel estimated using the SRS, $\alpha$ is a complex constant, and H is the actual downlink channel. In the case, a UE can calculate a CQI by assuming that a PDSCH is transmitted in transmit diversity mode as shown in Formula 14 and then transmit the calculated CQI.

$$CQI = \frac{|H|^2}{I} \quad \text{[Formula 14]}$$

In Formula 14, I indicates an interference power value.

In addition, the BS can estimate the actual downlink channel using the downlink channel estimated through the SRS and the CQI received from the UE as shown in Formula 15.

$$\hat{H} = \tilde{H} \frac{\sqrt{CQI}}{|\tilde{H}|} = \frac{\alpha}{|\alpha|} \frac{1}{\sqrt{I}} H \quad \text{[Formula 15]}$$

For example, it is assumed that the BS uses the antenna array shown in FIG. 17 or 18 and estimates the downlink channel using the SRS transmitted in uplink, and the UE does not report the PMI/RI. In this case, the downlink channel can be adjusted by assuming that the PDSCH is transmitted in the transmit diversity mode as described above.

However, in the LTE/LTE-A standards, the transmit diversity is defined only for the 2-antenna port and 4-antenna port. That is, a transmit diversity scheme for an antenna array in excess of the 4-antenna port has not been defined. In the current system, it is expected that the performance of a transmit diversity scheme where the use of the 8-antenna port is assumed will be relatively low, and thus, it is not preferred to define transmit diversity only for the CQI feedback.

In an embodiment of the present invention, proposed is a method for estimating a downlink channel in a 2D AAS by calculating a CQI based on the predefined 2 or 4-antenna port transmit diversity scheme.

For convenience of description, it is assumed that the 2D AAS has an 8×4 structure. Specifically, it is assumed that a $k^{th}$ B block (where k=0, . . . , 7) has 4 antenna ports (or TXRU) as shown in FIG. 18. Thus, assuming that the PDSCH for the antenna ports of the $k^{th}$ B block is transmitted based on the 4-antenna port transmit diversity, the CQI can be calculated as shown in Formula 14. In addition, when the UE transmits, to the BS, CQIs calculated based on the individual k blocks to the BS, the BS can adjust channels using the received k (e.g., k=8) CQI values and channels estimated through the SRS.

CQI Feedback in Accordance with Simultaneous Transmission at all CSI-RS Antenna Ports According to an embodiment of the present invention, CSI-RSs can be simultaneously transmitted at all CSI-RS antenna ports for CQI measurement.

The CQI measured by the UE can be transmitted through the PUSCH or PUCCH. Particularly, when the CQI is transmitted through the PUSCH, k CQI values measured using k blocks can be simultaneously transmitted. On the other hand, when the CQI is transmitted through the PUCCH, the k CQI values measured using the k blocks can be sequentially transmitted one by one. This is because of payload limitation. Thus, when the CQI is transmitted through the PUCCH, latency may occur until the BS obtains the adjusted channel due to latency between a time at which the CQI is measured and a time at which the CQI is transmitted.

Meanwhile, the BS should be able to obtain the CQI value and information on a CSI-RS antenna port used to measure the corresponding CQI value. For example, the BS should be able to know which block among the k blocks is related to the CQI received from the UE. To this end, an implicit relationship can be defined between a subframe in which the PUCCH is transmitted and a CSI-RS antenna port. For example, assuming that the BS simultaneously transmits CSI-RSs in a subframe n and the UE sequentially reports CQIs from a subframe (n+4) through PUCCHs, the implicit relationship can be defined such that CQIs for CSI-RS antenna ports included in a block index 0 are transmitted in the subframe (n+4) and CQIs for CSI-RS antenna ports included in a block index m are transmitted in the subframe (n+4+m). However, the present invention is not limited thereto.

CQI Feedback in Accordance with Sequential Transmission at CSI-RS Antenna Port

According to another embodiment of the present invention, TDM can be applied to the CSI-RS transmission for the CSI feedback. For example, the BS can apply the TDM to the CSI-RS transmission by performing CSI-RS transmission for some CSI-RS ports at a first time and another CSI-RS transmission for the remaining CSI-RS ports is performed at a second time.

The BS can signal the UE a CSI-RS antenna port for transmitting the CSI-RS on a reference resource where the CQI is measured. For example, it is assumed that CSI-RS antenna ports belonging to a first block transmit CSI-RSs using reference resources included in a first frame and CSI-RS antenna ports belonging to a second block transmit CSI-RSs using reference resources included in a second frame. That is, the BS can signal the UE which block's antenna ports transmit CSI-RSs in each subframe.

The CQI measured by the UE can be transmitted through the PUSCH or PUCCH. Particularly, when the CQI is transmitted through the PUSCH, the k CQI values measured using the k blocks can be simultaneously transmitted. For example, the UE can sequentially measure the k blocks and then transmit all the measured k CQI values through the PUSCH at once after completion of the measurement.

On the other hand, when the CQI is transmitted through the PUCCH, a CQI value measured using CSI-RS antenna ports in a single block can be transmitted one by one. This is because of limitation of payload that can be transmitted through PUCCH. Thus, when the CQI is transmitted through the PUCCH, latency may occur until the BS obtains the adjusted channel.

CQI Feedback Under the Assumption of 4-Transmit Diversity

According to a further embodiment of the present invention, the UE can provide the CQI feedback on the assumption that for antenna ports in a specific B block, the PDSCH is transmitted using 4-transmit diversity and the BS can adjust the downlink channel according to Formula 14 and 15.

For convenience, it is assumed that each of the complex constant α and the downlink interference power I has the same value for antenna ports in all blocks. Since it is expected that each of the downlink interference power and the complex constant has the same value in each antenna port, the above assumption can be valid.

Based on the above-mentioned assumption, a downlink channel estimation value for antenna ports in a $k^{th}$ B block can be defined as shown in Formula 16.

$$\tilde{H}_k = \alpha H_k \quad \text{[Formula 16]}$$

Under the assumption that the PDSCH is transmitted using the transmit diversity, the UE can calculate the CQI using CSI-RS antenna ports in the $k^{th}$ B block and then transmit the calculated CQI to the BS. In this case, the calculated CQI can be given as Formula 17.

$$CQI_k = \frac{|H_k|^2}{I} \quad \text{[Formula 17]}$$

The BS can adjust the estimated downlink channel using the received CQI from the EU. The adjusted downlink channel for the antenna ports in the $k^{th}$ B block can be given as Formula 18.

$$\hat{H}_k = \tilde{H}_k \frac{\sqrt{CQI_k}}{|\tilde{H}_k|} = \frac{\alpha}{|\alpha|}\frac{1}{\sqrt{I}}H_k = \frac{1}{|\alpha|\sqrt{I}}\tilde{H}_k \quad \text{[Formula 18]}$$

In Formula 18, it is possible to define a constant c as $$c = \frac{\hat{H}_k}{\tilde{H}_k} = \frac{1}{|\alpha|\sqrt{I}}.$$

When a downlink channel estimated for antenna ports in an $n^{th}$ B block (where n≠k) is defined as $\tilde{H}_n$, the adjusted downlink channel can be obtained as shown in Formula 19.

$$\hat{H}_n = c\tilde{H}_n = \frac{\alpha}{|\alpha|}\frac{1}{\sqrt{I}}H_n \quad \text{[Formula 19]}$$

It can be checked that Formula 19 is scaled with the same constant c as Formula 18.

As described above, since a downlink channel can be adjusted using a CQI for some antenna ports rather than all antenna ports in the 2D AAS, the 2D AAS has an advantage in that overhead caused by the CQI feedback is not increased. For example, since a CQI is measured and fed back using CSI-RS antenna ports in a specific B block, the current CQI feedback scheme can be applied.

The BS can signal the UE information on CSI-RS antenna ports that the UE should know to calculate a CQI for the PDSCH transmission based on the transmit diversity. For example, L1, MAC, or RRC signaling can be used.

Next, a method for configuring CSI-RS antenna ports to be referred for calculating a CQI will be described.

(1) Method for Fixing CSI-RS Antenna Ports to be Referred for CQI Measurement

For example, a UE can measure and report a CQI using CSI-RS antenna ports x1, x2, x3, and x4. The corresponding CSI-RS antenna ports may be fixedly determined in advance for the UE. Alternatively, a BS may inform the UE of the corresponding CSI-RS antenna ports.

(2) Method for Changing CSI-RS Antenna Ports to be Referred for CQI Measurement

For example, a UE can measure a CQI using CSI-RS antenna ports x1, x2, x3, and x4 in a first subframe and then measure another CQI using CSI-RS antenna ports y1, y2, y3, and y4 in a second subframe appearing after elapse of predetermined time from the first subframe. Thereafter, the UE can report the measured CQIs. It may be considered as sequential use of antenna ports in a plurality of blocks to adjust the downlink channel.

In this case, the BS can signal the UE CSI-RS antenna ports to be used for measurement and ordering thereof. For example, to inform the UE of use order of B blocks for CQI feedback with respect to CSI-RS antenna ports in the B blocks, the BS may signal the UE to measure and report CQIs for CSI-RS antenna ports in an order of blocks B0, B1, B2, B3, B4, B5, B6, and B7. In this case, information on time intervals of CSI reference resources for CSI-RS antenna ports in each antenna block can be signaled or determined in advance.

CQI Feedback Using CRS

The CQI feedback can be performed using not only the CSI-RS but also a CRS. When the CRS is used, the BS can maximize transmit power through antenna virtualization and thus, it has an advantage in that the UE can reduce an error in the CQI calculation.

When the CRS is transmitted through the antenna virtualization, a virtualized channel can be given as Formula 20.

$$G_i = \sum_{k=1}^{n} w_{ik} H_k \quad \text{[Formula 20]}$$

In Formula 20, $w_i$ corresponds to a virtualization matrix and can be defined as $w_i = [w_{i1}, w_{i2} \ldots w_{in}]$.

When a CRS antenna port is virtualized, a CQI based on the transmit diversity can be expressed as shown in Formula 21. The UE can calculate the CQI according to Formula 21 and then feedback the calculated CQI to the BS.

$$CQI = \frac{|G_i|^2}{I} = \frac{\left|\sum_{k=1}^{n} w_{ik} H_k\right|^2}{I} \quad \text{[Formula 21]}$$

Thereafter, the BS can adjust a channel according to Formula 22. That is, the adjusted channel can be expressed as shown in Formula 22.

$$\hat{H}_k = \tilde{H}_k \frac{\sqrt{CQI}}{|\tilde{G}_i|} \quad \text{[Formula 22]}$$

$$= \alpha \frac{\left|\sum_{k=1}^{n} w_{ik} H_k\right|}{\sqrt{I}} \frac{H_k}{\left|\sum_{k=1}^{n} w_{ik} \tilde{H}_k\right|}$$

$$= \frac{\alpha}{|\alpha|\sqrt{I}} \tilde{H}_k, \text{ where } \tilde{G}_i = \sum_{k=1}^{n} w_{ik} \tilde{H}_k$$

When intending to configure the CSI feedback mode in which PMI/RI are not transmitted, the BS can configure the CSI feedback mode in a semi-static manner using RRC signaling. However, when the RRC signaling is adopted, latency for reconfiguration may have a relatively large value. Therefore, for efficient system management, the BS can transmit PDCCH/EPDCCH by adding an indication of PMI/RI on/off to DCI having relatively small latency or configure the CQI feedback mode using MAC signaling. In this case, time information of a subframe in which CSI feedback is initiated by reflecting the PMI/RI on/off may be explicitly signaled to the UE or determined in advance.

Figure 19:
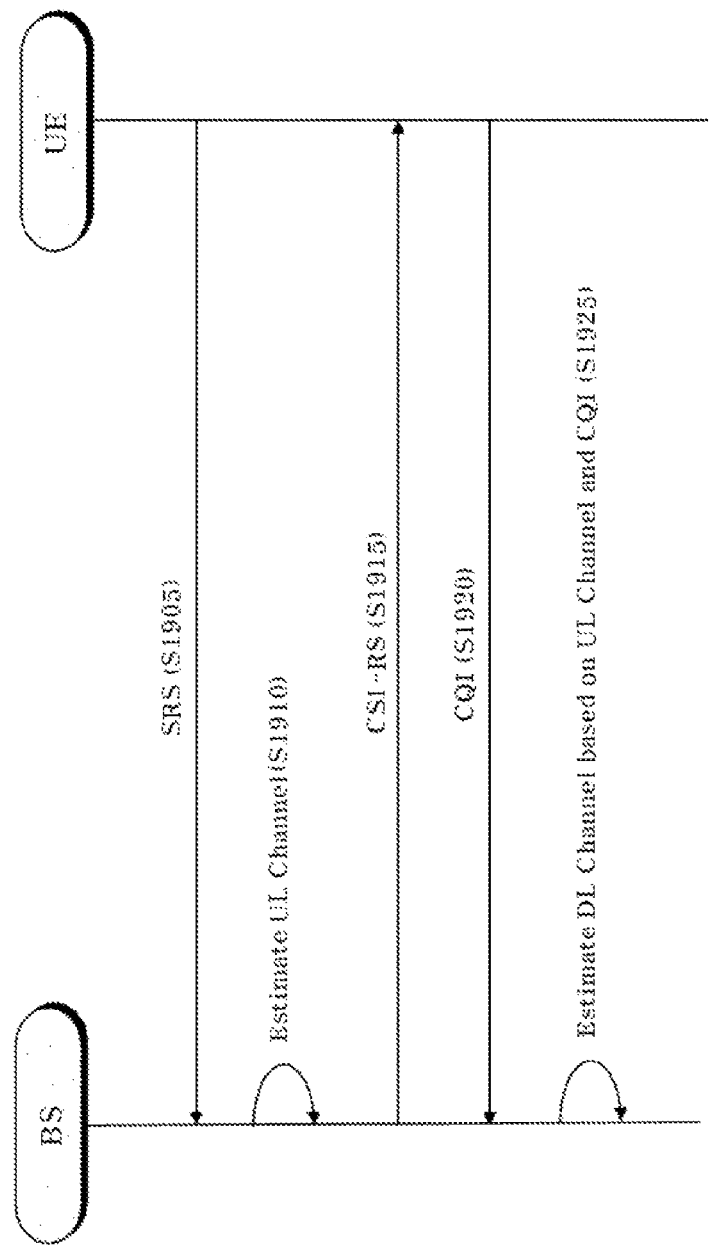
FIG. 19 is a flowchart for explaining a channel estimation method according to an embodiment of the present invention.

FIG. 19 is a flowchart for explaining a channel estimation method according to an embodiment of the present invention. To avoid redundant description, the already mentioned features shall be omitted in the following description.

Referring to FIG. 19, a UE transmits a sounding reference signal (SRS) to a BS [S1905].

Thereafter, the BS estimates an uplink channel using the SRS received from the UE [S1910]. For example, the BS may obtain an uplink channel matrix using the SRS.

The BS transmits a channel state information-reference signal (CSI-RS) through at least a part of antenna elements in a two-dimensional antenna array [S1915]. The BS can transmit the CSI-RS through any one of a plurality of antenna blocks arranged in a first direction in the 2D antenna array. For example, the any one antenna block through which the CSI-RS is transmitted can be explicitly signaled to the UE through radio resource control (RRC) signaling. Alternatively, the single antenna block can be implicitly indicated by a mapping relationship between CSI-RS time resources and the plurality of antenna blocks.

The UE can calculate a channel quality indicator (CQI) through the received CSI-RS. In this case, the CQI may be calculated under the assumption that a physical downlink shared channel (PDSCH) is transmitted based on a 4-transmit diversity scheme.

The BS receives the CQI calculated from the transmitted CSI-RS [S1920].

The BS obtains, through a prescribed correction factor obtained from the CQI and an uplink channel matrix, a downlink channel matrix for the the entire 2D antenna array including the remaining antenna elements not used for the CSI-RS transmission [S1925]. For example, the UE can calculate the downlink channel matrix by adjusting the uplink channel matrix using the prescribed correction factor. Here, the prescribed correction factor may indicate interference characteristics of downlink channels from the 2D antenna array to the UE. In addition, the prescribed correction factor can be defined as $$\frac{1}{|\alpha|\sqrt{I}},$$

where '$\alpha$' is a complex constant representing a relationship between estimated downlink channels and actual downlink channels and 'I' indicates downlink channel interference.

Meanwhile, a rank indicator (RI) and precoding matrix indicator (PMI) that are not fed back by the UE can be calculated using the obtained downlink channel matrix.

Figure 20:
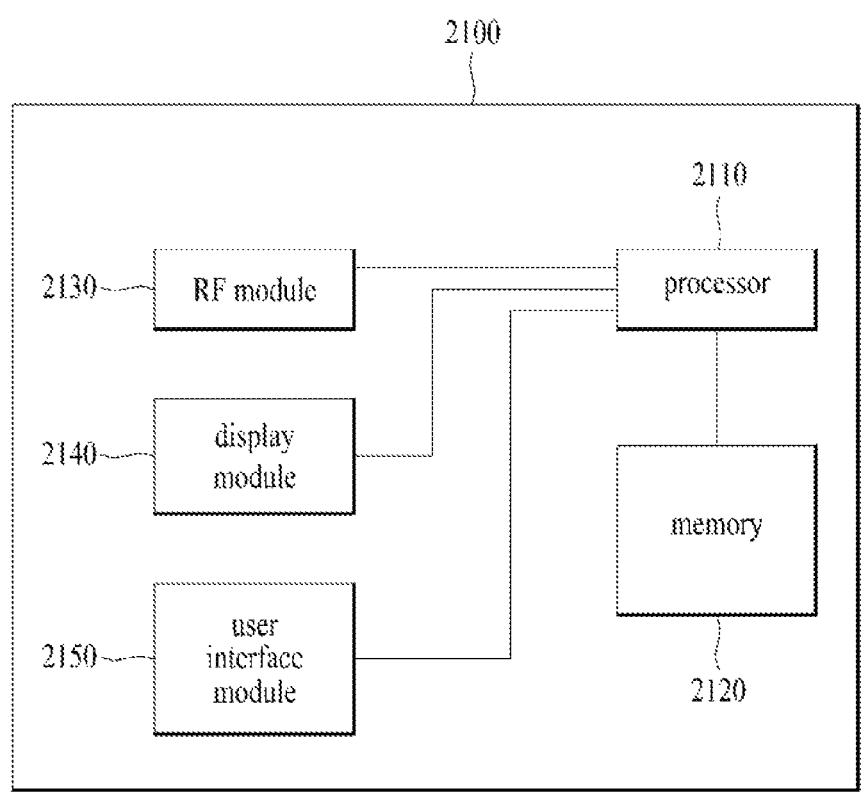
FIG. 20 is a block diagram of a communication device according to an embodiment of the present invention.

FIG. 20 is a block diagram of a communication device according to an embodiment of the present invention.

Referring to FIG. 20, the communication device 2100 may include a processor 2110, a memory 2120, a radio frequency (RF) module 2130, a display module 2140, and a user interface module 2150.

The communication device 2100 is illustrated for convenience of description. If necessary, some of the modules may be omitted or other necessary modules may be further included in the communication device 2100. In some cases, some modules may be divided into sub-modules. The processor 2110 may be configured to perform the operations in accordance with the embodiments of the present invention, which are illustrate with the accompanying drawings. In other words, details of operations of the processor 2110 have been described with reference to FIGS. 1 to 20.

The memory 2120 is connected to the processor 2110 and stores operating systems, applications, program codes, data, etc. The RF module 2130 is connected to the processor 2110 and converts a baseband signal into a radio signal or converts a radio signal into a baseband signal. To this end, the RF module 2130 performs analog conversion, amplification, filtering, and frequency up-conversion, or inverse procedures thereof. The display module 2140 is connected to the processor 2110 and displays various information. The display module 2140 may be implemented using well-known elements such as a liquid crystal display (LCD), a light emitting diode (LED), and an organic light emitting diode (OLED). However, the invention is not limited thereto. The user interface module 2150 is connected to the processor 2110 and may implemented by combining well-known user interfaces such as a keypad, a touchscreen, etc.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

In this disclosure, a specific operation explained as performed by a base station can be performed by an upper node of the base station in some cases. Particularly, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be achieved by various means, for example, hardware, firmware, software, or a combination thereof. In a hardware configuration, the methods according to the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to various wireless communication systems as well as the 3GPP LTE system.

What is claimed is:

1. A method for estimating a channel by a base station (BS) in a wireless communication system, the method comprising:
obtaining an uplink channel matrix using a sounding reference signal (SRS) received from a user equipment (UE);
transmitting a channel state information-reference signal (CSI-RS) through at least a part of antenna elements in a two-dimensional (2D) antenna array of the BS;
receiving a channel quality indicator (CQI) calculated from the transmitted CSI-RS; and
obtaining, through a prescribed correction factor obtained from the CQI and the uplink channel matrix, a downlink channel matrix for the entire 2D antenna array including remaining antenna elements not used for the CSI-RS transmission,
wherein the prescribed correction factor is defined as $$\frac{1}{|\alpha|\sqrt{I}},$$

where 'α' is a complex constant representing a relationship between estimated downlink channels and actual downlink channels and 'I' indicates downlink channel interference.

2. The method of claim 1, wherein the obtaining the downlink channel matrix comprises calculating the downlink channel matrix by adjusting the uplink channel matrix using the prescribed correction factor.

3. The method of claim 1, wherein the prescribed correction factor represents interference characteristics of downlink channels from the 2D antenna array to the UE.

4. The method of claim 1, wherein the transmitting the CSI-RS comprises transmitting the CSI-RS through one of a plurality of antenna blocks arranged in a first direction in the 2D antenna array.

5. The method of claim 4, wherein the one antenna block through which the CSI-RS is transmitted is either explicitly indicated to the UE through radio resource control (RRC) signaling or implicitly indicated by a mapping relationship between CSI-RS time resources and the plurality of the antenna blocks.

6. The method of claim 1, wherein the CQI is calculated by assuming that a physical downlink shared channel (PDSCH) is transmitted based on either a 2-transmit diversity scheme or a 4-transmit diversity scheme.

7. The method of claim 1, wherein a rank indicator (RI) and a precoding matrix index (PMI), which are not fed back by the UE, are calculated from the obtained downlink channel matrix.

8. A base station (BS) in a wireless communication system, the BS comprising:
a transmitter configured to transmit a channel state information-reference signal (CSI-RS) through at least a part of antenna elements in a two-dimensional (2D) antenna array of the BS;
a receiver configured to receive a channel quality indicator (CQI) calculated from the transmitted CSI-RS; and
a processor configured to obtain an uplink channel matrix using a sounding reference signal (SRS) from a user equipment (UE) and obtain, through a prescribed correction factor obtained from the CQI and the uplink channel matrix, a downlink channel matrix for the entire 2D antenna array including remaining antenna elements not used for the CSI-RS transmission,
wherein the prescribed correction factor is defined as $$\frac{1}{|\alpha|\sqrt{I}},$$

where 'α' is a complex constant representing a relationship between estimated downlink channels and actual downlink channels and 'I' indicates downlink channel interference.

9. The BS of claim 8, wherein the processor is configured to calculate the downlink channel matrix by adjusting the uplink channel matrix using the prescribed correction factor.

10. The BS of claim 8, wherein the prescribed correction factor represents interference characteristics of downlink channels from the 2D antenna array to the UE.

11. The BS of claim 8, wherein the transmitter is configured to transmit the CSI-RS through one of a plurality of antenna blocks arranged in a first direction in the 2D antenna array.

12. The BS of claim 11, wherein the one antenna block through which the CSI-RS is transmitted is either explicitly indicated to the UE through radio resource control (RRC)

signaling or implicitly indicated by a mapping relationship between CSI-RS time resources and the plurality of the antenna blocks.

* * * * *